(12) United States Patent
Deindl et al.

(10) Patent No.: US 11,597,265 B2
(45) Date of Patent: Mar. 7, 2023

(54) MOTOR VEHICLE

(71) Applicant: AUDI AG, Ingolstadt (DE)

(72) Inventors: Andreas Deindl, Großmehring (DE); Marvin Czech, Ingolstadt (DE); Christoph Kreutzer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 33 days.

(21) Appl. No.: 16/969,287

(22) PCT Filed: Feb. 21, 2019

(86) PCT No.: PCT/EP2019/054301
§ 371 (c)(1),
(2) Date: Aug. 12, 2020

(87) PCT Pub. No.: WO2019/174882
PCT Pub. Date: Sep. 19, 2019

(65) Prior Publication Data
US 2021/0008970 A1    Jan. 14, 2021

(30) Foreign Application Priority Data
Mar. 14, 2018    (DE) .................. 10 2018 203 921.6

(51) Int. Cl.
*B60K 1/00*     (2006.01)
*B60K 1/04*     (2019.01)

(52) U.S. Cl.
CPC ........ *B60K 1/04* (2013.01); *B60K 2001/0438* (2013.01); *B60Y 2400/112* (2013.01); *B60Y 2410/114* (2013.01)

(58) Field of Classification Search
CPC ... B60K 1/04; B60K 2001/0438; B60L 53/80; B60L 50/60
See application file for complete search history.

(56) References Cited

U.S. PATENT DOCUMENTS

| 9,819,060 B2 * | 11/2017 | O'Hora | H01M 50/256 |
| 9,853,267 B2 * | 12/2017 | Page | H01M 50/20 |
| 2005/0111167 A1 * | 5/2005 | Yamaguchi | H01M 10/625 |
| | | | 361/676 |

(Continued)

FOREIGN PATENT DOCUMENTS

| CN | 204144345 U | 2/2015 |
| DE | 10 2005 049 570 B3 | 4/2007 |

(Continued)

OTHER PUBLICATIONS

German Examination Report dated Nov. 20, 2018 in corresponding German Application No. 10 2018 203 921.6; 16 pages including Machine-generated Translation attached.

(Continued)

*Primary Examiner* — Hau V Phan
(74) *Attorney, Agent, or Firm* — Maier & Maier, PLLC

(57) ABSTRACT

A motor vehicle having a vehicle body an electrical traction machine, and at least one electrical energy accumulator designed as a traction battery for temporarily storing electrical energy for operating the traction machine. The vehicle body and/or a battery housing of the traction battery is/are provided at least in some regions within intumescent fire protection coating.

17 Claims, 1 Drawing Sheet

(56) References Cited

U.S. PATENT DOCUMENTS

| | | | | |
|---|---|---|---|---|
| 2005/0170238 A1* | 8/2005 | Abu-Isa | ............... | H01M 50/342 |
| | | | | 429/82 |
| 2010/0127565 A1* | 5/2010 | Fukazu | ................... | B60L 50/60 |
| | | | | 307/9.1 |
| 2011/0014514 A1 | 1/2011 | Mehta et al. | | |
| 2012/0308858 A1* | 12/2012 | Hermann | ............ | H01M 50/183 |
| | | | | 429/82 |
| 2013/0153317 A1 | 6/2013 | Rawlinson et al. | | |
| 2015/0221914 A1* | 8/2015 | Page | ................... | H01M 50/394 |
| | | | | 429/82 |
| 2016/0221443 A1* | 8/2016 | Yao | ....................... | H01M 50/24 |
| 2017/0057556 A1* | 3/2017 | Vollmer | .................. | B60L 50/64 |
| 2017/0198473 A1* | 7/2017 | Pilz | ....................... | E04B 2/7411 |

FOREIGN PATENT DOCUMENTS

| | | |
|---|---|---|
| DE | 102011017459 A1 | 10/2012 |
| DE | 10 2012 019 674 A1 | 4/2014 |
| DE | 10 2013 200 546 A1 | 7/2014 |
| DE | 10 2016 215 131 B3 | 12/2017 |
| EP | 2 244 318 A2 | 10/2010 |
| EP | 2 843 727 A1 | 3/2015 |
| JP | 2010129349 A | 6/2010 |
| WO | 2009/121655 A1 | 10/2009 |
| WO | 2015/113858 A2 | 8/2015 |

OTHER PUBLICATIONS

International Search Report dated May 17, 2019 in corresponding International Application No. PCT/EP2019/054301; 6 pages.
Written Opinion dated May 17, 2019 in corresponding International Application No. PCT/EP2019/054301; 18 pages including Machine-generated Translation attached.
International Preliminary Report on Patentability dated Sep. 15, 2020, in connection with corresponding International Application No. PCT/EP2019/054301 (8 pp.).
First Office Action dated Dec. 2, 2022, in corresponding Chinese Application No. 201980018405.9, 16 pages.

* cited by examiner

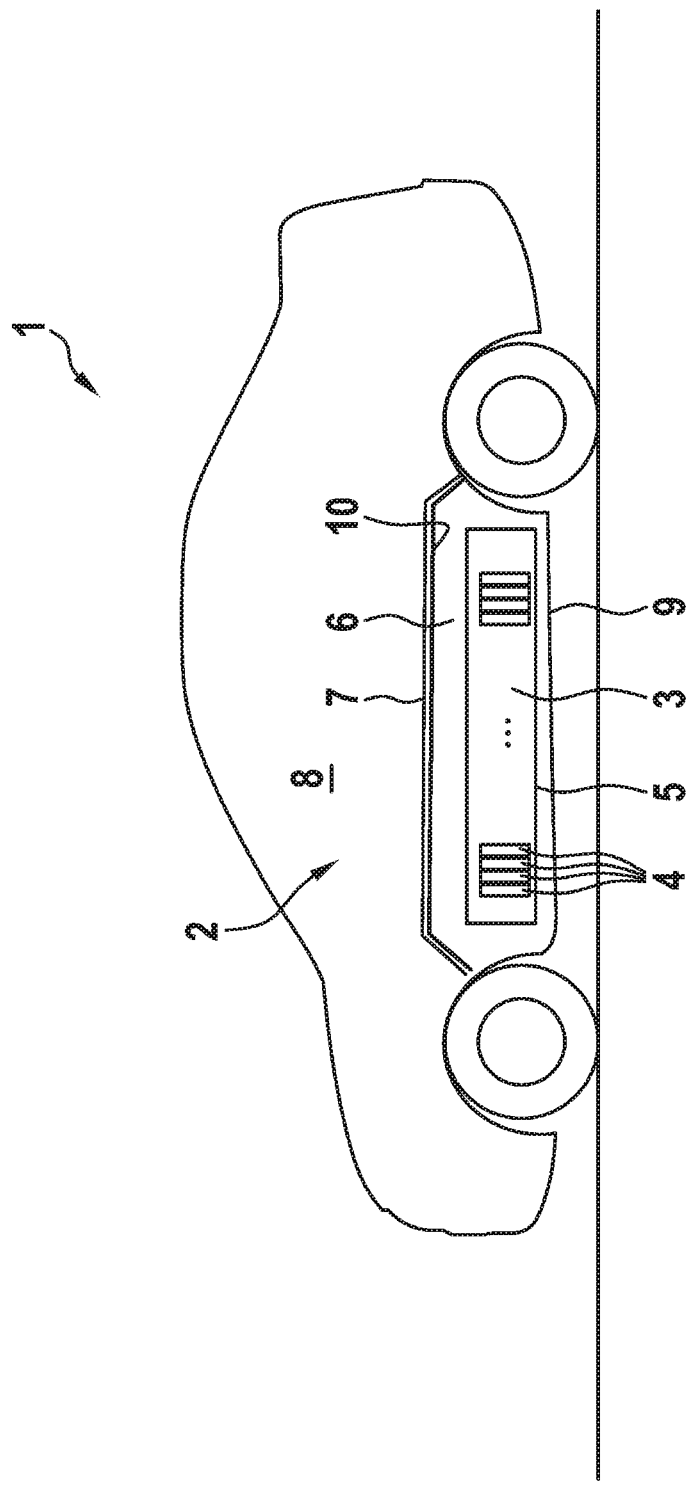

MOTOR VEHICLE

FIELD

The disclosure relates to a motor vehicle having a vehicle body, an electrical traction machine, and at least one electrical energy accumulator designed as a traction battery for temporarily storing electrical energy for operating the traction machine.

BACKGROUND

Document EP 2 843 727 A1 is known from the prior art, for example. This describes a battery device in which a water-absorbing polymer is arranged in an interior of a battery housing. As soon as water is introduced into the battery housing, a sealing film tears due to a weight of the water. The water is then absorbed by the water-absorbing polymer. A large part of the water is then in the form of a gel-like element.

Furthermore, document WO 2015/113858 A2 describes a battery module having at least one, preferably a plurality of battery cells, which are essentially plate-like and are surrounded by a foam structure, wherein the foam structure has at least two foam layers having identical or different mechanical, physical, and/or chemical properties. It is the object of the invention to propose a motor vehicle which has advantages over known motor vehicles, in particular offers a particularly high level of safety in case of a malfunction of the electrical energy accumulator, in particular for occupants of the motor vehicle.

SUMMARY

It is provided that the vehicle body and/or a battery housing of the traction battery is/are provided at least in regions with an intumescent fire protection coating.

The motor vehicle has the electrical traction machine, which is provided and designed to provide a torque directed toward driving the motor vehicle. The motor vehicle is thus provided in the form of an electric motor vehicle or a hybrid motor vehicle. The traction machine is operable using electrical energy which is temporarily stored in an electrical energy accumulator. The electrical energy accumulator is provided in the form of a traction battery, which has a battery voltage adapted to the rated voltage of the traction machine. The battery voltage of the traction battery is preferably at least 100 V, at least 200 V, at least 300 V, at least 400 V, at least 600 V, or at least 800 V.

The energy accumulator or the traction battery preferably has a plurality of battery cells which are arranged in the common battery housing. In the event of a fault or a defect of the energy accumulator, hot gases can escape and/or a temperature can increase. Both the hot gases and also the temperature increase can result in a fire in the motor vehicle. To prevent spreading of the fire or even occurrence of the fire, the energy accumulator, in particular the battery housing, preferably consists at least in regions of fire-retardant materials. Due to the technological progress in energy accumulators, the energy density and with it the thermal energy released in case of fault are constantly increasing. The use of fire-retardant materials alone can sometimes no longer be sufficient to isolate, delay, or completely prevent a fire. In addition, existing fire-retardant materials can sometimes not be used in an outside area of the motor vehicle.

For this reason, it is provided that the vehicle body and/or the battery housing are provided at least in regions with the fire protection coating. The fire protection coating can thus be provided on the vehicle body, the battery housing, or both. The intumescent fire protection coating is to be understood as a coating that foams up in the event of a fire or under the influence of heat and thus significantly increases its layer thickness. The fire protection coating is therefore applied to the vehicle body and/or the battery housing having a specific layer thickness. This layer thickness is maintained as long as the temperature of the fire protection coating is below a certain limiting value. If the temperature reaches or exceeds the limiting value, the fire protection coating thus foams up so that the layer thickness increases starting from the first layer thickness, namely up to a second layer thickness which is greater than the first layer thickness. For example, the second layer thickness is greater than the first layer thickness by a factor of at least 5, at least 10, at least 25, at least 50, at least 75, or at least 100.

The limiting value is preferably selected in such a way that it is greater than a temperature occurring during intended operation of the energy accumulator, but less than a temperature to be expected in case of fault. Due to the foaming of the fire protection coating in case of a fire, the thermal conductivity of the fire protection coating is significantly reduced. The fire protection coating thus has a first thermal conductivity at the first layer thickness and a second thermal conductivity at the second layer thickness, wherein the second thermal conductivity is less than the first thermal conductivity. Particularly outstanding thermal isolation of the energy accumulator from further regions of the motor vehicle is thus achieved in case of fire with the aid of the fire protection coating.

A further design of the invention provides that the vehicle body has a vehicle body component which delimits a battery receptacle space for accommodating the traction battery and is provided with the fire protection coating on its side facing toward the battery receptacle space. The battery receptacle space is formed on or in the body of the motor vehicle. It is delimited at least in some regions by the vehicle body component. For example, the vehicle body component is provided in the form of a flat component, which is arranged between a passenger compartment of the motor vehicle and the traction battery or the battery receptacle space.

The vehicle body component delimits the battery receptacle space at least in some regions. However, it can be provided and designed to completely enclose the battery receptacle space. The traction battery is arranged in the battery receptacle space. To effectuate the above-described insulation effect in case of fire, the vehicle body component is provided with the fire protection coating on its side facing toward the battery receptacle space. This is to be understood to mean that at least one region of the side facing toward the battery receptacle space has the fire protection coating. The entire side of the vehicle body component facing toward the battery receptacle space is particularly preferably provided with the fire protection coating.

In the scope of a further advantageous design of the invention, it can be provided that the vehicle body component has the fire protection coating on its side facing away from the battery receptacle space. Additionally or alternatively to the arrangement on the side facing towards the battery receptacle space, the fire protection coating is thus applied to the side facing away from it. A design is particularly preferred in which the fire protection coating is provided on both sides, because a particularly good insulation effect in case of fire is achieved in this way. For example, the fire protection coating is formed on the side of the vehicle body component facing towards the battery receptacle space in such a way that it has a higher activation temperature than the fire protection coating on the side facing away from the battery receptacle space. The activation temperature is to be understood as the temperature at or above which the fire protection coating foams up.

A particularly preferred refinement of the invention provides that the vehicle body component is a floor panel of the motor vehicle. In the case of the floor panel, the battery receptacle space is arranged on the side facing away from the passenger compartment of the motor vehicle, thus between an underlying surface on which the motor vehicle is arranged and the floor panel. A particularly installation-space-efficient arrangement of the energy accumulator is implemented using such a design of the motor vehicle.

A further preferred design of the invention provides that the battery receptacle space is designed to be weatherproof. For example, a cover is provided for this purpose, which is fastened on the floor panel of the motor vehicle and encloses the battery receptacle space together with the floor panel. The cover is preferably fastened to the floor panel so it is detachable without damage, to enable easy replacement of the energy accumulator. The weatherproof design of the battery receptacle space is to be understood to mean that the battery receptacle space is at least protected from the penetration of coarse dirt and/or critical amounts of water. The weatherproof design thus does not mean that the battery receptacle space is completely sealed, in particular completely waterproof. The weatherproof design of the battery receptacle space has the advantage that damage or passivation of the fire protection coating by environmental influences, for example by water, is reliably prevented.

A further preferred design of the invention provides that the battery housing has the fire protection coating on its outside. The fire protection coating on the battery housing can be provided additionally or alternatively to the fire protection coating on the vehicle body component. The battery housing preferably has the fire protection coating exclusively on its outside to avoid mechanical impairment of the battery cell arranged in the battery housing when the fire protection coating is foamed. The battery housing preferably consists of a material which has good thermal conductivity, in particular better thermal conductivity than the fire protection coating in the non-foamed state. This ensures that the heat accumulating in the battery housing in case of fire is supplied to the fire protection coating, so that it foams up and subsequently effectuates reliable thermal insulation of the traction battery.

A particularly preferred further embodiment of the invention provides that the fire protection coating has ammonium polyphosphate, polyurethane, and/or sodium silicate. For example, the polyurethane is used as a carrier material in which the ammonium polyphosphate and/or the sodium silicate are provided. The ammonium polyphosphate is used to foam up the fire protection coating if the temperature exceeds the limiting value. In this case, the ammonium polyphosphate is decomposed to produce phosphoric acid. In addition, a substance which reacts with phosphoric acid to form a gas which foams up the fire protection coating is now provided in the fire protection coating, for example a polyvalent alcohol. This reacts with the phosphoric acid to form phosphate esters, from which ultimately carbon dioxide is produced, which results in the foaming of the fire protection coating.

Additionally or alternatively to the ammonium polyphosphate, the sodium silicate can be used to achieve the foaming of the fire protection coating if the temperature reaches or exceeds the temperature limiting value. The substances mentioned enable the fire protection coating to foam up reliably in case of fire and are also largely weatherproof, so that they can be readily used on the motor vehicle.

A further design of the invention provides that the polyurethane is foamed. The polyurethane can already be at least partially foamed when it is applied in the form of the fire protection determination. Thus, a certain thermal insulation effect is achieved even if the fire protection coating is not (further) foamed. The foaming of the polyurethane also ensures that the further foaming of the fire protection coating takes place particularly reliably in case of fire.

A further refinement of the invention provides that the fire protection coating is a multiple coating which has multiple fire protection layers. The fire protection coating thus consists of the multiple fire protection layers, which are applied in succession to produce the fire protection coating. For example, each of the fire protection layers consists of the same material. However, the fire protection layers can at least partially consist of different materials. For example, a first of the fire protection layers has ammonium polyphosphate and a second of the fire protection layers has sodium silicate, but not the respective other material. The use of the multiple fire protection layers ensures particularly effective foaming of the fire protection coating in case of fire, so that a good thermal insulation effect is implemented.

Finally, it can be provided in the scope of a particularly preferred further embodiment of the invention that the fire protection coating is designed as an acoustic insulation layer. For example, it can be provided that the fire protection coating is applied to an acoustic insulation layer. The acoustic insulation layer is thus provided between the fire protection coating and the vehicle body or the battery housing. The acoustic insulation layer is designed in such a way that the propagation of sound or the passage of sound through the acoustic insulation layer is at least partially prevented. By applying the fire protection coating to the acoustic insulation layer, the latter does not have to be provided separately on the respective component, so that a particularly compact and space-saving design is achieved. However, it is particularly preferably provided that the fire protection coating serves as an acoustic insulation layer. In this case, a further reduction of the space requirement is implemented.

BRIEF DESCRIPTION OF THE DRAWING

In the following, the invention will be explained in greater detail with reference to the exemplary embodiments depicted in the drawings, without the invention being restricted. In the single FIGURE FIG. 1 shows a schematic illustration of a motor vehicle.

DETAILED DESCRIPTION

The FIGURE shows a schematic illustration of a motor vehicle 1, which has a vehicle body 2. The motor vehicle 1 has an electrical traction machine (not shown here) and a traction battery 3, in which electrical energy for operating the traction machine can be temporarily stored. The traction battery 3 is preferably composed of a plurality of battery cells 4, only a few of which are identified by way of example. The battery cells 4 are arranged in a battery housing 5, which in turn is located in a battery receptacle space 6 of the motor vehicle 1.

The battery receptacle space 6 is delimited at least in regions by the vehicle body 2, namely a vehicle body component 7 of the vehicle body 2. The vehicle body component 7 is preferably arranged as shown here between a passenger compartment 8 of the motor vehicle 1 and the traction battery 3. For example, the vehicle body component 7 is provided in the form of a floor panel of the motor vehicle 1. The battery receptacle space 6 can be designed to be weatherproof by means of a cover 9. The cover 9 is preferably fastened to the vehicle body 2, in particular fastened so it is detachable without damage, so that easy replacement of the traction battery 3 is ensured.

An intumescent fire protection coating 10 is applied to the body component 7 at least in some regions or over the entire surface. The fire protection coating 10 is designed in such a way that it foams up, i.e., increases its material thickness, in case of fire of the traction battery 3 or if the temperature in the battery receptacle space 6 exceeds a limiting value. As a result, the thermal conductivity of the fire protection coating 10 is significantly reduced, so that in particular the passenger compartment 8 is protected from a thermal influence of the traction battery 3.

The fire protection coating 10 preferably additionally serves as an acoustic insulation layer, so that the separate attachment or application of such an acoustic insulation layer can be dispensed with. Of course, however, it can alternatively be provided that the fire protection coating 10 is applied to an acoustic insulation layer. A compact formation is also achieved in this case.

The described design of the motor vehicle 1 has the advantage that the vehicle body 2 and above all a passenger compartment 8 is reliably protected from a thermal influence of the traction battery 3, in particular in case of fire. The intumescent fire protection coating 10 is used for this purpose, which has, for example, ammonium phosphate, polyurethane, and/or sodium silicate.

The invention claimed is:

1. A motor vehicle comprising:
   a traction battery comprising a plurality of battery cells arranged within a battery housing, the traction battery configured to temporarily store electrical energy, and
   a battery receptacle space in which the battery housing is arranged, whereby the housing is contained at least partially by a vehicle body component delimiting the battery receptacle space,
   wherein an outer surface of the battery housing is provided with a first fire protection coating,
   wherein an inner surface of the vehicle body component, which faces the battery housing, is provided with a second fire protection coating, and
   wherein the first fire protection coating and the second fire protection coating each comprise an intumescent coating.

2. The motor vehicle as claimed in claim 1, wherein an outer surface of the vehicle body component, which faces away from the battery housing, is provided with a third fire protection coating comprising the intumescent coating.

3. The motor vehicle as claimed in claim 2, wherein the second fire protection coating has a higher activation temperature than the third fire protection coating.

4. The motor vehicle as claimed in claim 1, wherein the vehicle body component is a floor panel of the motor vehicle arranged between the battery housing and a passenger compartment.

5. The motor vehicle as claimed in claim 1, wherein the battery receptacle space is further delimited by a weatherproof cover.

6. The motor vehicle as claimed in claim 1, wherein the intumescent coating comprises at least one of ammonium polyphosphate, polyurethane, and sodium silicate.

7. The motor vehicle as claimed in claim 1, wherein the intumescent coating comprises polyurethane, and
   wherein the intumescent coating is at least partially foamed when applied to at least one of the battery housing and the vehicle body component.

8. The motor vehicle as claimed in claim 1, wherein at least one of the first fire protection coating and the second fire protection coating comprise the intumescent coating applied in a plurality of successive layers.

9. The motor vehicle as claimed in claim 8, wherein a first of the plurality of successive layers comprises ammonium polyphosphate, and
   wherein a second of the plurality of successive layers comprises sodium silicate but does not include ammonium polyphosphate.

10. The motor vehicle as claimed in claim 8, wherein a first of the plurality of successive layers comprises sodium silicate, and
    wherein a second of the plurality of successive layers comprises ammonium polyphosphate but does not include sodium silicate.

11. The motor vehicle as claimed in claim 8, wherein a first of the plurality of successive layers comprises sodium silicate but does not include ammonium polyphosphate, and
    wherein a second of the plurality of successive layers comprises ammonium polyphosphate but does not include sodium silicate.

12. The motor vehicle as claimed in claim 1, wherein at least one of the first fire protection coating and the second fire protection coating is configured to be an acoustic insulation layer.

13. The motor vehicle as claimed in claim 1, wherein the second fire protection coating is applied to an acoustic insulation layer of the vehicle body component.

14. The motor vehicle as claimed in claim 1, wherein the first fire protection coating is the only fire protection coating with which the battery housing is provided.

15. The motor vehicle as claimed in claim 14, wherein a structure of the battery housing to which the first fire protection coating is applied has a higher thermal conductivity than that of the first fire protection coating.

16. The motor vehicle as claimed in claim 1, wherein the intumescent coating comprises ammonium polyphosphate, polyurethane, and sodium silicate.

17. The motor vehicle as claimed in claim 16, wherein intumescent coating further comprises polyvalent alcohol.

* * * * *